United States Patent [19]

Gandiglio et al.

[11] Patent Number: 5,005,849
[45] Date of Patent: Apr. 9, 1991

[54] STEERING DEVICE FOR THE REAR AXLE OF A MOTOR VEHICLE

[75] Inventors: Romolo Gandiglio, Villanova d'Asti; Ernestino Bellone, Turin, both of Italy

[73] Assignee: Fiat Auto S.p.A., Tokyo, Japan

[21] Appl. No.: 341,603

[22] Filed: Apr. 21, 1989

[30] Foreign Application Priority Data

Apr. 27, 1988 [IT] Italy ............................... 67392 A/88

[51] Int. Cl.⁵ ............................ B62D 5/00; B62D 15/00
[52] U.S. Cl. ................................... 280/97; 280/113; 280/91
[58] Field of Search ............... 280/97, 91, 99, 100, 280/113, 114, 125

[56] References Cited

U.S. PATENT DOCUMENTS

| 661,594 | 11/1900 | Young | 280/97 |
|---|---|---|---|
| 3,669,202 | 6/1972 | Anderson | |
| 4,146,109 | 3/1979 | Barth | 280/97 |
| 4,286,798 | 9/1981 | Bulter | 280/91 |

FOREIGN PATENT DOCUMENTS

| 096345 | 12/1983 | European Pat. Off. | |
|---|---|---|---|
| 252805 | 1/1988 | European Pat. Off. | |
| 3200879 | 3/1983 | Fed. Rep. of Germany | |
| 3524763 | 1/1986 | Fed. Rep. of Germany | |
| 3629881 | 3/1987 | Fed. Rep. of Germany | |
| 3627422 | 2/1988 | Fed. Rep. of Germany | |

*Primary Examiner*—Charles A. Marmor
*Assistant Examiner*—Karin Tyson
*Attorney, Agent, or Firm*—Sughrue, Mion, Zinn, Macpeak & Seas

[57] ABSTRACT

A rear suspension (1) for motor vehicles comprises a suspension support frame (2) fixed to the body of the motor vehicle and carrying the members (3) for supporting and guiding the rear wheels (4) of the motor vehicle.

A suspension support frame (2) is connected to the body of the vehicle for rotation about a vertical axis (A), contained substantially in the longitudinal median plane of the motor vehicle, by a plurality of attachment members (5). Each attachment member (5) comprises a first element fixed to the body and a second element fixed to the suspension support frame (2). The second element is mounted for sliding on the first element in a direction which is tangential to a circumference whose center lies on the vertical axis (A).

8 Claims, 4 Drawing Sheets

STEERING DEVICE FOR THE REAR AXLE OF A MOTOR VEHICLE

BACKGROUND OF THE INVENTION

The present invention relates to a rear suspension for motor vehicles including a suspension support-frame fixed to the body of the motor vehicle and carrying the members for supporting and guiding the rear wheels of the motor vehicle.

The invention particularly concerns a system for steering the rear axle of the vehicle in the same sense as the front wheels in order to improve road-holding, stability, travelling comfort and the general dynamic behaviour of the vehicle. The system according to the invention is also able to steer the axle in the opposite sense in order to improve the manoeuvrability of the vehicle.

SUMMARY OF THE INVENTION

The object of the present invention is to provide a device which can achieve relatively large steering angles whilst remaining within the limits of a simple and cheap structure.

According to the present invention, this object is achieved by virtue of the fact that the suspension support frame is connected to the body of the vehicle so as to be rotatable about a vertical axis contained substantially in the longitudinal median plane of the motor vehicle, by means of a plurality of attachment members, each comprising a first element fixed to the body and a second element mounted for sliding on the first element in a direction which is tangential to a circumference whose centre lies on the vertical axis, the second element being fixed to the suspension support-frame.

In one embodiment, the second element of each attachment member conveniently comprises a plate fixed to the suspension support-frame and provided with at least one bush mounted for sliding on a guide pin fixed to the first element of the attachment member.

In this embodiment, the first element of each attachment member preferably comprises two guide pins on which two bushes fixed to the sides of plate constituting the second element are slidably mounted.

The first element is also to advantage constituted by a plate having a peripheral edge which is turned over so that the two guide pins are fixed at their ends to the turned-over edges of two opposite sides of the plate.

The plate constituting the first element conveniently has a slot within which a stop element carried by the plate constituting the second element is engaged, the stop element cooperating with the slot to define the extreme end-of-travel position of the second element relative to the first element.

The plate constituting the second element is connected to the suspension support-frame by means of a rubber support.

The second element of at least one of the attachment members is conveniently connected to actuator means, preferably of hydraulic or mechanical type, for controlling the angular position of the suspension support-frame relative to the body.

Two hydraulic actuators, associated with two different attachment members, are preferably provided. A simple and effective device in thus provided which, in particular, can easily be fitted to all motor vehicle models which are equipped with rear suspensions which have a support frames.

BRIEF DESCRIPTION OF THE DRAWINGS

The subject of the present invention will now be described with reference to the appended drawings, provided purely by way of non-limiting example, in which.

DETAILED DESCRIPTION OF THE INVENTION

Figure 1:
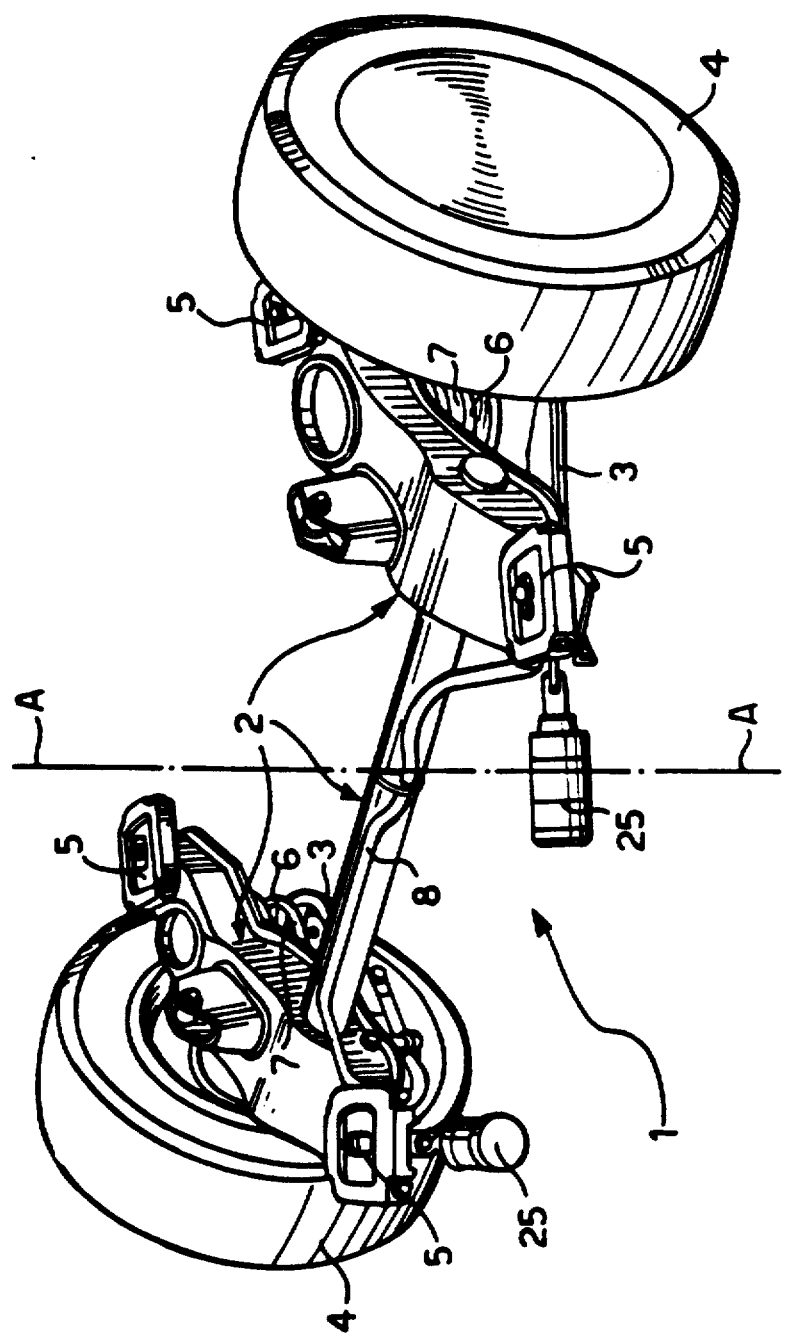
FIG. 1 is a perspective view of the rear suspension of a motor vehicle.
Figure 2:
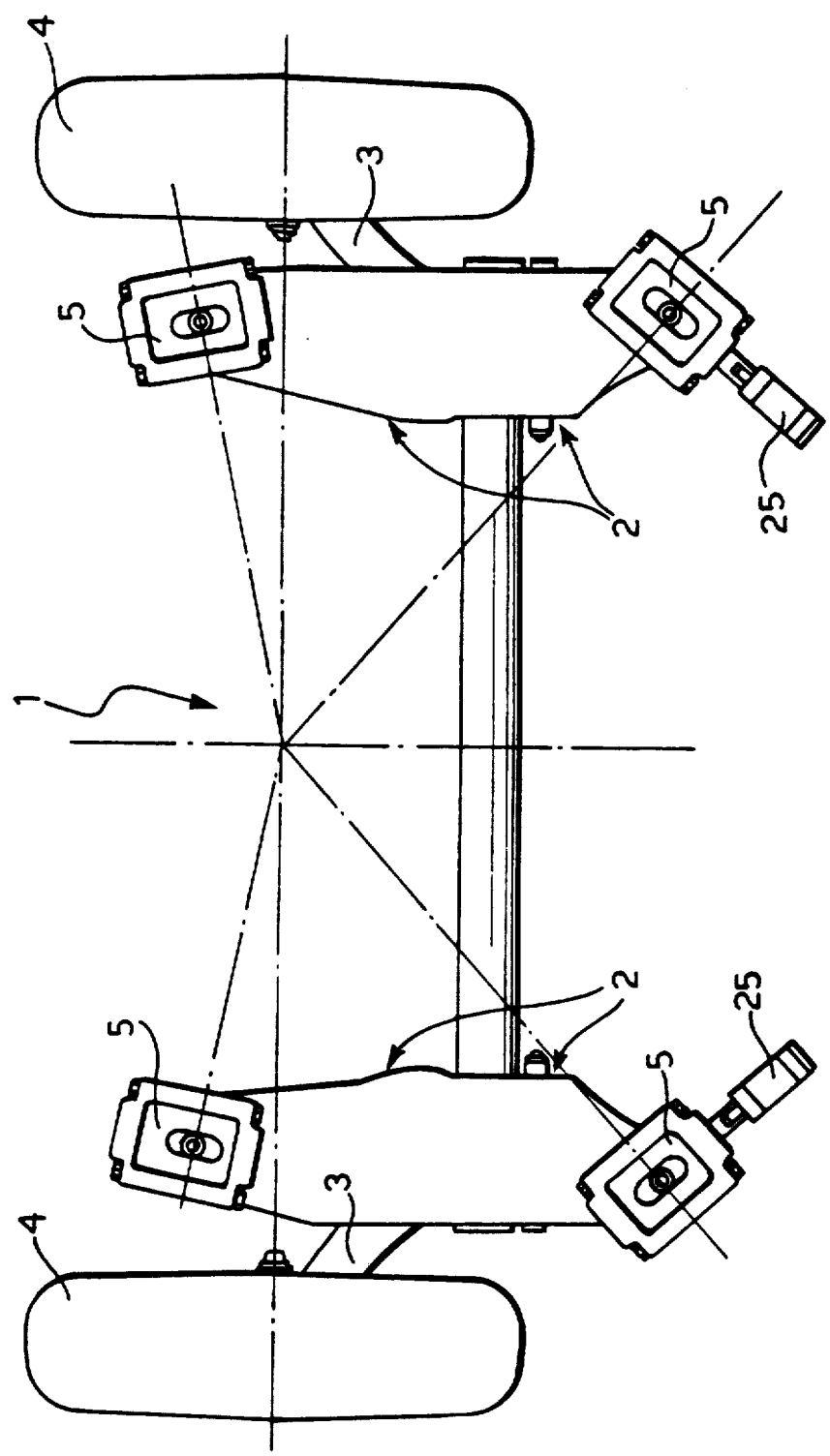
FIG. 2 is a plan view of the suspension.
Figure 3:
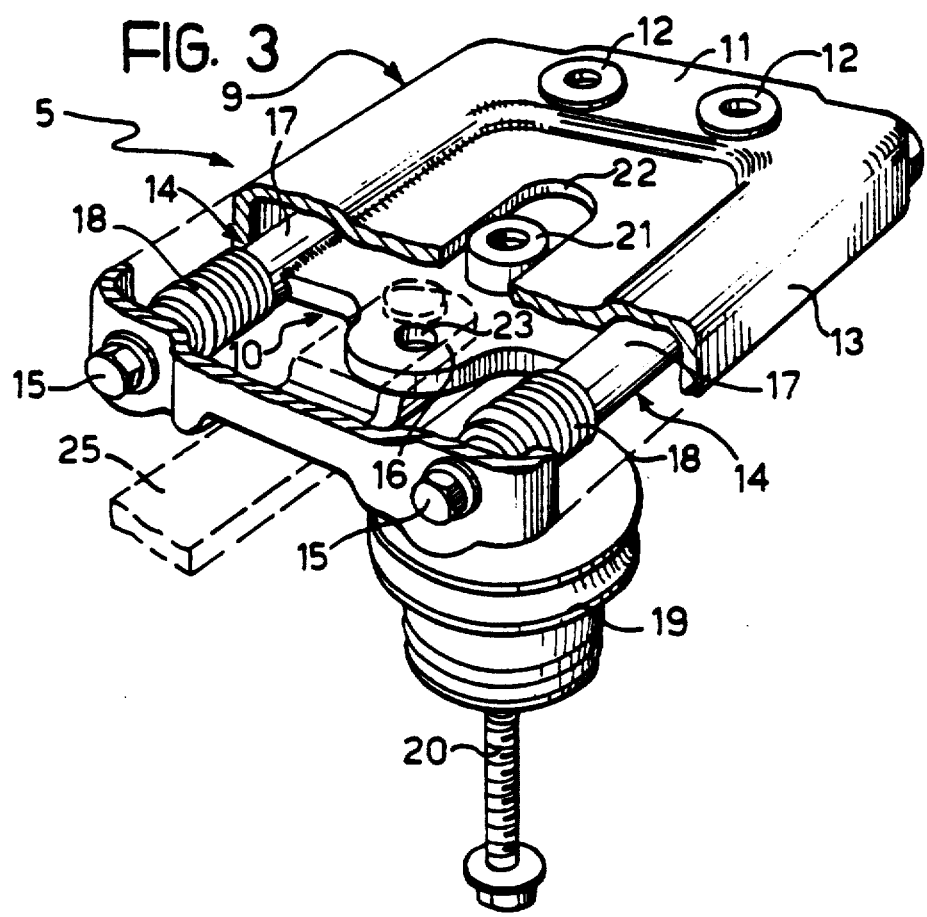
FIG. 3 is a partially-sectional perspective view of a member for the attachment of the suspension.
Figure 5:
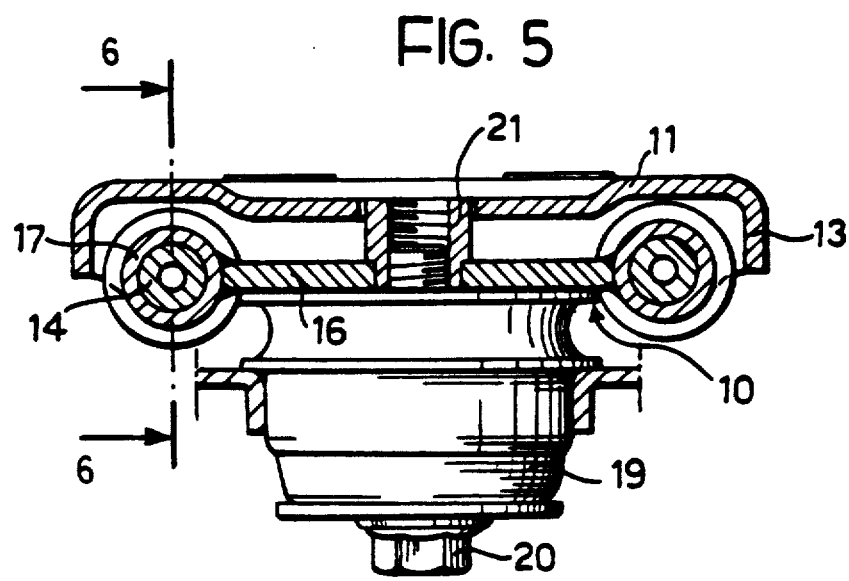
FIG. 5 is a section taken on the line I—I of FIG. 4.
Figure 4:
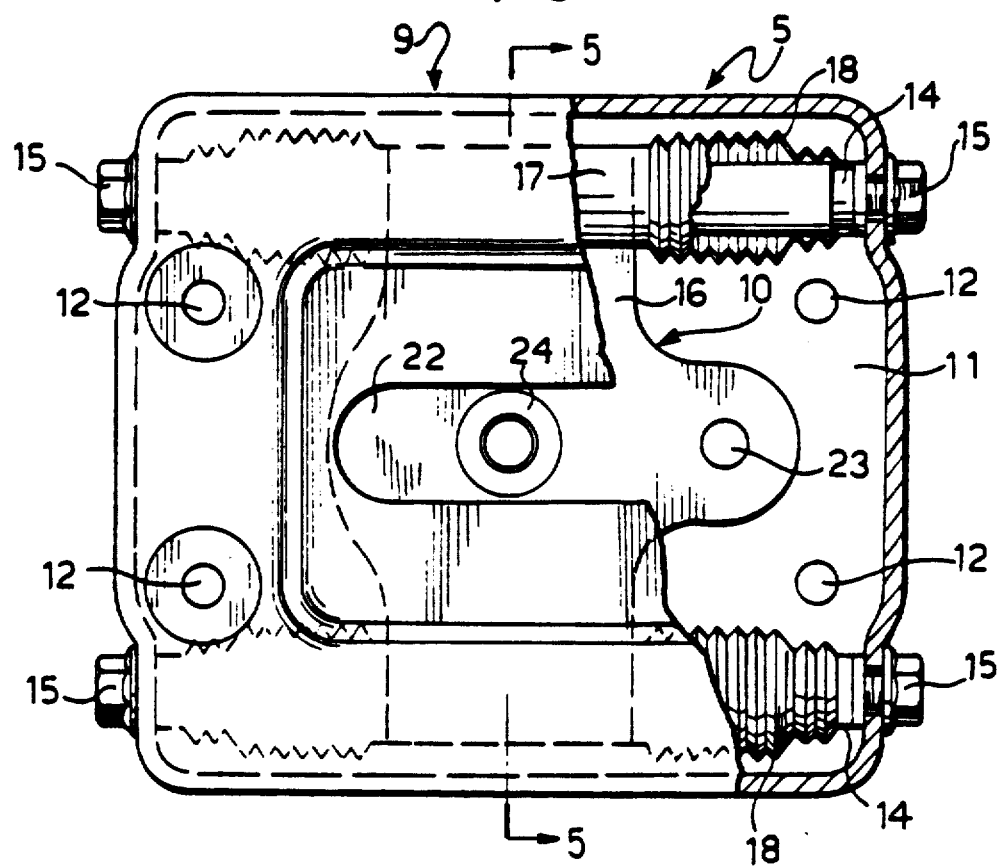
FIG. 4 is a plan view of the attachment member shown in FIG. 3.
Figure 6:
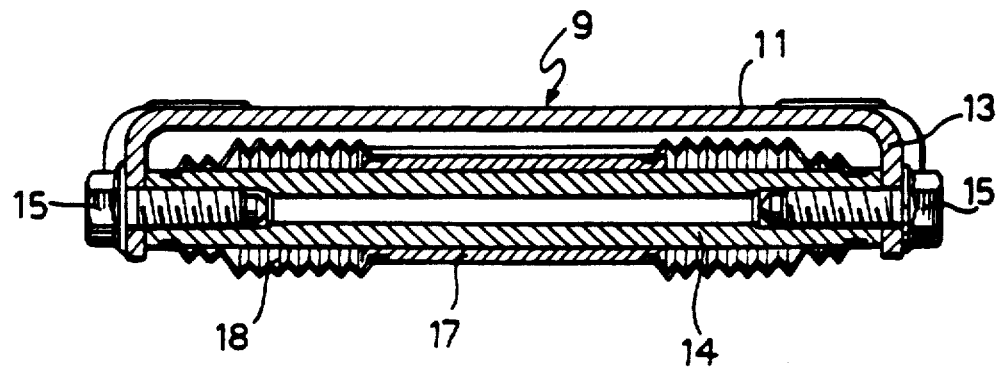
FIG. 6 is a section taken on the line II—II of FIG. 5.

A motor-vehicle rear suspension is generally indicated 1 and includes a support frame 2. Pivoting longitudinal arms 3 support wheels 4 and are articulated to the support frame 2. Helical springs 6 and shock-absorbers 7 are situated between the pivoting arms and the support frame 2. An anti-roll bar 8 is situated between the longitudinal arms 3. The suspension support-frame 2 is fixed to the body of the vehicle by means of four attachment members 5.

Each attachment member 5 comprises a first element 9 fixed to the body of the vehicle and a second element 10 fixed to the suspension support-frame 2. The first element 9 is constituted by a plate 11 in which holes 12 are formed for attachment to the body of the vehicle. The plate 11 has a turned-over peripheral edge 13. The ends of two guide pins 14 are fixed by means of screws 15 to the two opposite sides of the plate 11. The second element 10 of the attachment member 5 constituted by a plate 16 to whose sides two bushes 17 are fixed. The bushes 17 are slidably mounted on the guide pins 14; in order to facilitate sliding, the contact between the bushes 17 and the guide pins 14 is lubricated and protective covers 18 are provided for the sealing of the lubricant.

The plate 16 constituting the second element 10 is fixed to the suspension support frame 2 by means of a rubber support 19. A screw 20 forms the connections between the support frame 2, the rubber support 19 and the plate 16 of the second element 10 and is engaged in a stop element 21. The stop element 21 is slidable in a slot 22 formed in the plate 11 of the first element 9 to define the extreme end-of-travel position of the second element 10 relative to the first element 9.

The plate 16 of the second element 10 has a hole 23 for attachment to a rod 24 of a hydraulic actuator 25.

Each attachment member 5 is mounted on the suspension support-frame 2 so that the direction in which the second element 10 slides relative to the first element 9 is tangential to a circumference whose centre lies on a vertical axis A contained substantially in the longitudinal median plane of the motor vehicle.

During the steering of the vehicle either an hydraulic control unit of the conventional type, or a mechanical type reversing device (not shown), activates the actuators 25 to effect a travel which is predetermined in dependence on the steering angle of the front wheels. The second elements 10 of the attachment members 5 thus move relative to the first elements 9 and steer the rear axle.

What we claim is:

1. A rear suspension for motor vehicles having four steerable wheels including a suspension support frame adapted to be fixed to the body of the motor vehicle and carrying members for supporting and guiding the rear wheels of the motor vehicle, wherein the suspension support frame is adapted to be connected to the body of the vehicle for rotation about a vertical axis contained substantially in the longitudinal median plane of the motor vehicle, by means of a plurality of attachment members, each attachment member comprising a first element adapted to be fixed to the body and a second element mounted for sliding in a straight line on the first element in a direction which is tangential to a circumference whose centre lies on said vertical axis, the second element being fixed to the suspension support frame.

2. A suspension according to claim 1, wherein the second element of each attachment member comprises a plate fixed to the suspension support frame and provided with at least one bush mounted for sliding on a guide pin fixed to the first element of the attachment member.

3. A suspension according to claim 2, wherein the first element of each attachment member includes two guide pins on which two bushes, fixed to two sides of the plate constituting the second element, are slidably mounted.

4. A suspension according to claim 3, wherein the first element is also constituted by a plate having a turned-over peripheral edge and in that the two guide pins are fixed at their ends to the turned-over edge of two opposite sides of the plate.

5. A suspension according to claim 4, wherein the plate constituting the first element has a slot within which a stop element carried by the plate constituting the second element is engaged, the stop member cooperating with the slot to define the extreme end-of-travel positions of the second element relative to the first element.

6. A suspension according to claim 2, wherein the plate constituting the second element is connected to the suspension support frame by means of a rubber support.

7. A suspension according to claim 1, wherein the second element of at least one of the attachment members is connected to actuator means for controlling the angular position of the suspension relative of the body.

8. A suspension according to claim 7, wherein two hydraulic actuators are provided, associated with two different attachment members.

* * * * *